United States Patent [19]

Rizzi et al.

[11] Patent Number: 5,020,752
[45] Date of Patent: Jun. 4, 1991

[54] ADJUSTABLE PEDESTAL FOR TABLES AND THE LIKE

[75] Inventors: John J. Rizzi, Weston, Conn.; Joseph J. Smith, Palm, Pa.

[73] Assignee: Westinghouse Electric Corporation, Pittsburgh, Pa.

[21] Appl. No.: 536,399

[22] Filed: Jun. 12, 1990

[51] Int. Cl.⁵ .................................... F16M 11/00
[52] U.S. Cl. ........................ 248/162.1; 108/146; 108/147; 188/67; 188/300; 248/157; 267/177; 297/345
[58] Field of Search ............... 248/162.1, 161, 404, 248/407, 157, 411, 406.2; 108/106, 144, 146, 147; 297/345; 188/67, 300; 267/177

[56] References Cited

U.S. PATENT DOCUMENTS

| | | | |
|---|---|---|---|
| 3,014,682 | 12/1961 | Veneman | 248/161 |
| 3,191,902 | 6/1965 | Goller | 108/146 X |
| 3,547,394 | 12/1970 | Wehner | 297/345 X |
| 3,885,764 | 5/1975 | Pabreza | 248/162.1 |
| 4,139,175 | 2/1979 | Bauer | 248/404 |
| 4,183,689 | 1/1980 | Wirges et al. | 248/404 X |
| 4,657,218 | 4/1987 | Scheberle et al. | 248/162.1 X |
| 4,693,442 | 9/1987 | Sills | 248/157 X |
| 4,728,072 | 3/1988 | Mitchell | 248/411 X |
| 4,817,898 | 4/1989 | Locher | 248/161 |
| 4,899,969 | 2/1990 | Bauer et al. | 248/161 |

FOREIGN PATENT DOCUMENTS

| | | | |
|---|---|---|---|
| 2406338 | 8/1975 | Fed. Rep. of Germany | 297/345 |
| 0125019 | 5/1949 | Sweden | 297/345 |
| 0168984 | 9/1934 | Switzerland | 297/345 |

*Primary Examiner*—Ramon O. Ramirez
*Attorney, Agent, or Firm*—Mason, Fenwick & Lawrence

[57] ABSTRACT

An adjustable pedestal comprises a tubular base, a tubular collar telescopically, slidably engaging the exterior of the base, a guide tube interior to the base, an extension spring mechanism positioned within the guide tube for biasing the pedestal in an extended position, and a locking mechanism for locking the pedestal in the desired position. The base, collar, and guide tube are coaxial. The collar is movable between an extended and a retracted position with respect to the base, and the guide tube is movable with the collar between an extended and a retracted position with respect to the base. The extension spring mechanism comprises a pair of parallel, spaced-apart extension springs, the axes of which are parallel to the axes of the base, collar, and guide tube and normally biases the collar and the guide tube in their extended positions. The extension springs are in a retracted condition. Thus, when force is exerted on the top of the guide tube, the extension springs assume an extended condition. The guide tube is provided with a longitudinally-extending locking slot, and the locking mechanism comprises a locking block and a locking screw slidable in the locking slot.

2 Claims, 2 Drawing Sheets

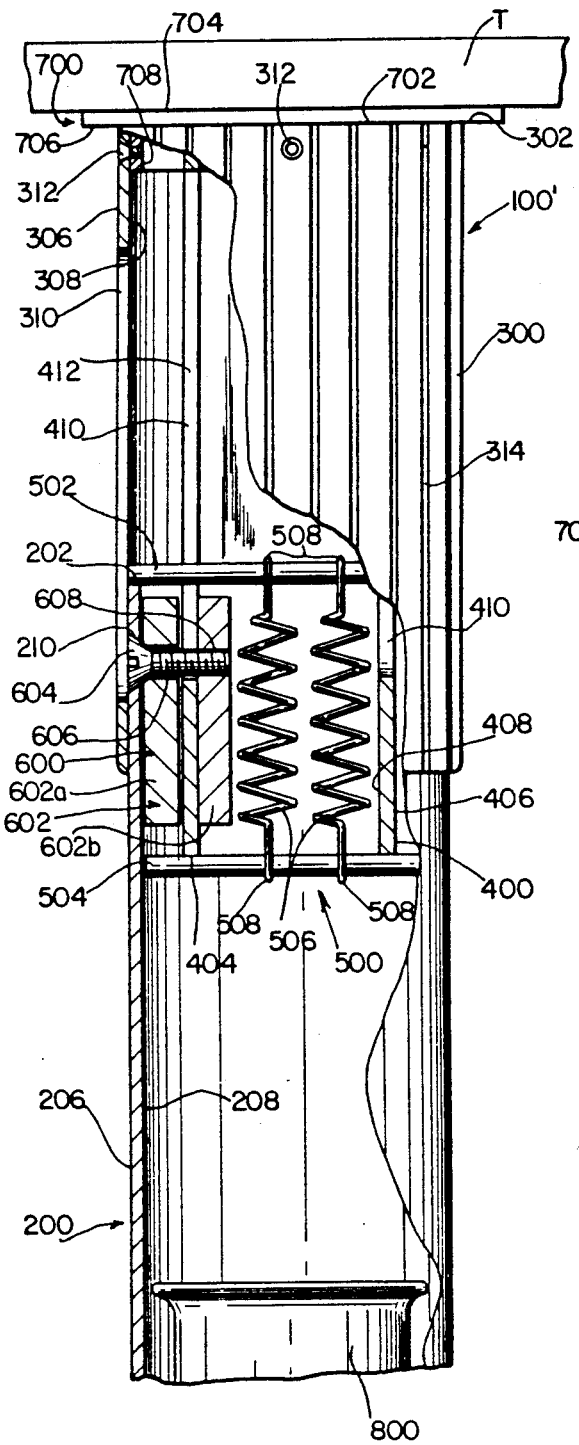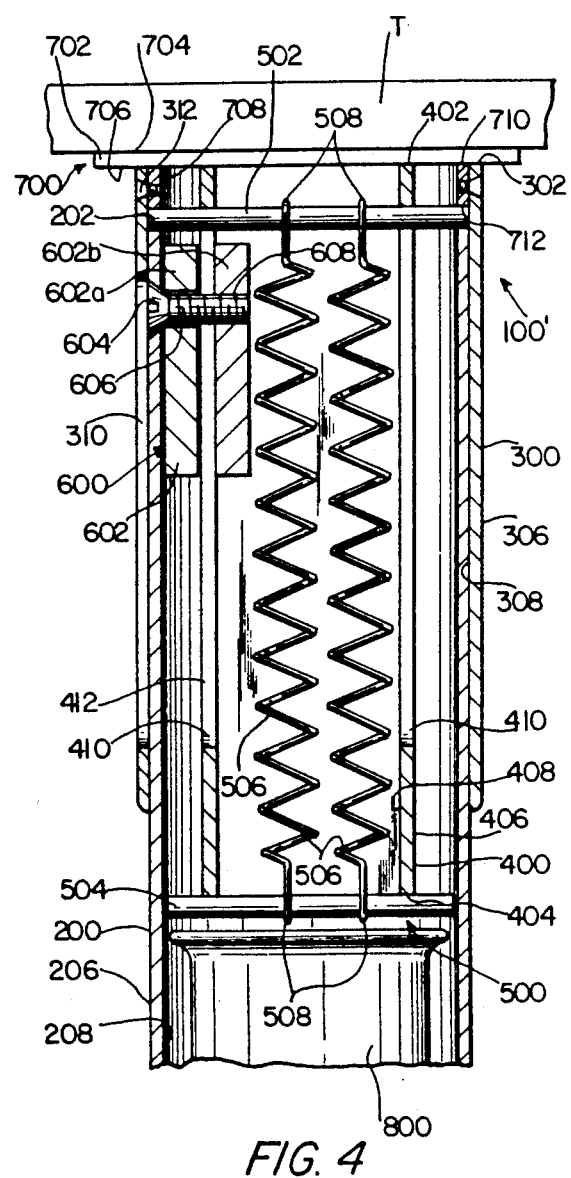
FIG. 3
FIG. 4

ADJUSTABLE PEDESTAL FOR TABLES AND THE LIKE

The present invention is directed to the field of adjustable pedestals, and is more specifically directed to an adjustable pedestal for use with a table top, a chair, or other articles of furniture or the like, the height of which it may be desirable to adjust.

BACKGROUND OF THE INVENTION

There are many mechanisms available for providing an adjustable pedestal for use in tables, chairs, and other articles of furniture where adjustments in height may be desirable. One of the more common mechanisms comprises a compression spring housed in a vertical base, and a tubular member in sliding telescopic engagement with the base which is biased upwardly by the compression spring. Exertion of force over the top of the mechanism compresses the springs, lowering the pedestal into a desired position into which it can be locked. Examples of such mechanisms are disclosed in U.S. Pat. No. 1,888,478 to Steidl and U.S. Pat. No. 4,657,218 to Scheberle et al. Some of these pedestals require elaborate mechanisms to lock the telescoping members against relative movement. Such mechanisms are disclosed in U.S. Pat. No. 3,191,902 to Goller and U.S. Pat. No. 4,693,442 to Sills.

One disadvantage of all of the above-described mechanisms lies in their use of compression springs. The compression spring must be positioned at or near the bottom of the pedestal base in order for the adjustment mechanism to work. This precludes the use of a weight of any significant extent in the bottom of the base. Furthermore, the locking mechanisms generally used in adjustable pedestals are obtrusive in appearance, extending outwardly from the body of the pedestal and interfering with its appearance.

In many situations, it would be desirable to place an axially extending weight in the bottom of the pedestal in order to stabilize the article of furniture with which it is used. Also, it would be desirable to provide a locking mechanism which is unobtrusive and does not spoil the aesthetic appeal of the article of furniture. It is the solution of these and other problems to which the present invention is directed.

SUMMARY OF THE INVENTION

Therefore, it is a primary object of this invention to provide a pedestal for tables, chairs, other articles of furniture, and the like which is easily adjustable.

It is another object of this invention to provide an adjustable pedestal which can be weighted at the bottom.

It is another object of this invention to provide an adjustable pedestal in which the locking mechanisms does not intrude significantly upon the aesthetic appearance of the article of furniture or the like as a whole.

Further objects and advantages as well as the features and details of the present invention are apparent from the accompanying drawings, specification, and claims.

The above and other objects of the invention are achieved by the provision of an adjustable pedestal which comprises a tubular base, a tubular collar telescopically, slidably engaging the exterior of the base, a guide tube interior to the base, an extension spring mechanism positioned within the guide tube for biasing the pedestal in an extended position, and a locking mechanism for locking the pedestal in the desired position.

The collar is coaxial with the base and is movable between an extended and a retracted position with respect to the base. The guide tube is movable with the collar between an extended and a retracted position with respect to the base. The extension spring mechanism normally biases the collar and the guide tube in their extended positions, and is itself normally in a retracted condition. Thus, when force is exerted on the top of the guide tube, the extension spring mechanism assumes an extended condition.

In one aspect of the invention, the extension spring mechanism comprises a pair of parallel, spaced-apart extension springs, the axes of which are parallel to the axes of the base, collar, and guide tube.

In another aspect of the invention, the guide tube is provided with a longitudinally-extending locking slot, and the locking mechanism comprises a locking block and a locking screw slidable in the locking slot. The locking block comprises an inner block and an outer block positioned respectively against the interior and exterior surfaces of the guide tube in alignment with the locking slot. The screw is inserted through bores in the inner and outer blocks and the locking slot, and can be tightened to lock the blocks together against the guide tube or loosened to permit movement of the guide tube and the collar relative to the base.

A better understanding of the disclosed embodiments of the invention will be achieved when the accompanying detailed description is considered in conjunction with the appended drawings, in which like reference numerals are used for the same parts as illustrated in the different figures.

BRIEF DESCRIPTION OF THE DRAWINGS

FIG. 3 is a cross-sectional view of a second embodiment of an adjustable pedestal according to the invention, in the extended position.

FIG. 4 is a cross-sectional view of the adjustable pedestal of FIG. 3, in the retracted position.

DESCRIPTION OF THE PREFERRED EMBODIMENTS

Figures 1, 2:
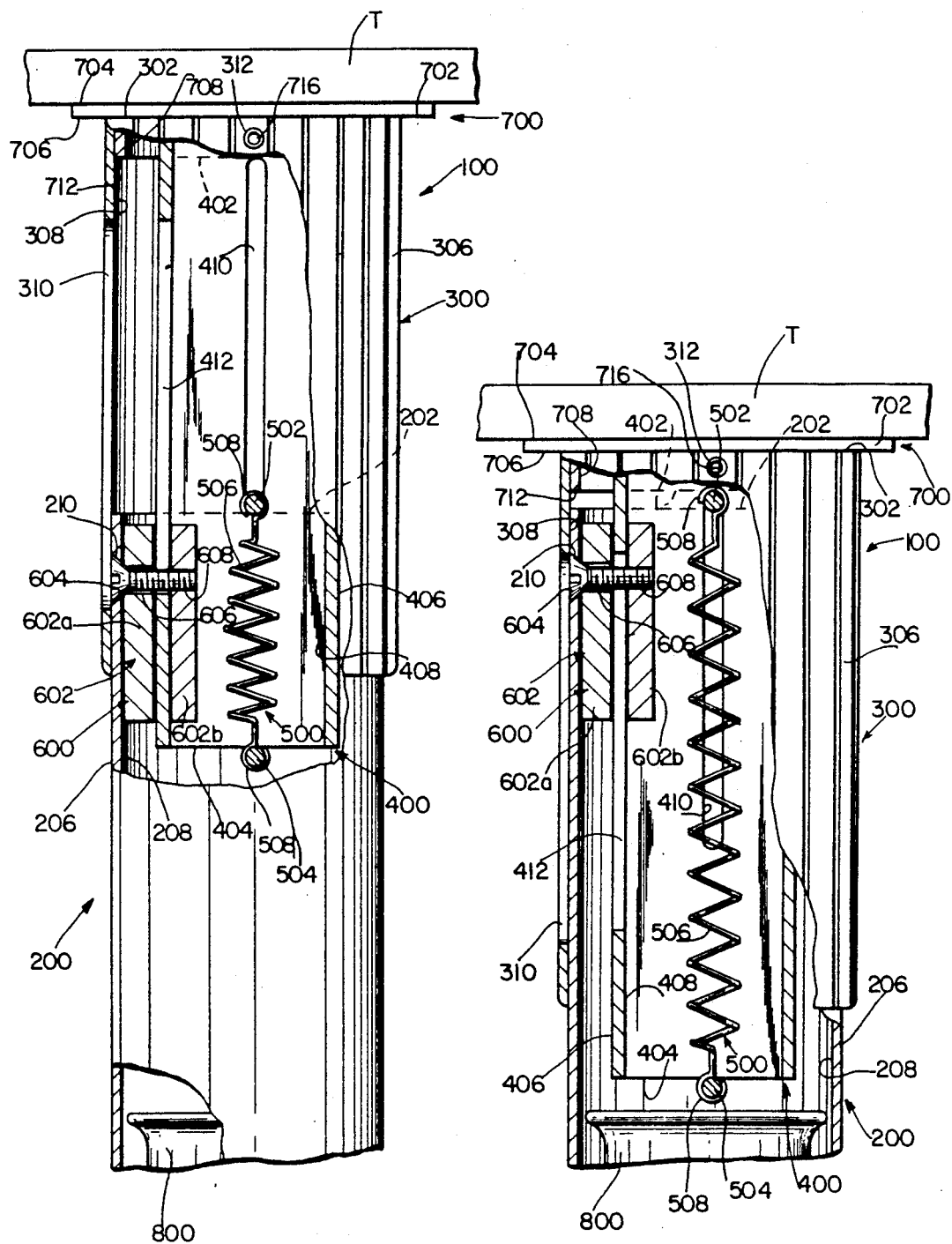
FIG. 1 is a cross-sectional view of a first embodiment of an adjustable pedestal according to the invention, in the extended position.
FIG. 2 is a cross-sectional view of the adjustable pedestal of FIG. 1, in the retracted position.

In describing the preferred embodiments of the subject invention illustrated in the drawings, specific terminology will be resorted to for the sake of clarity. However, the invention is not intended to be limited to specific terms so selected, and it is to be understood that each specific term includes all technical equivalents which operate in a similar manner to accomplish a similar purpose.

Referring not to FIGS. 1 and 2, there is shown a first embodiment of an adjustable pedestal 100 according to the invention. As shown in FIGS. 1 and 2, a table top T is mounted on pedestal 100. However, the pedestal according to the invention is not limited to use in tables, but can be used in chairs or other articles of furniture or the like.

Adjustable pedestal 100 comprises a tubular base 200, a tubular collar 300 telescopically engaging base 200, a guide tube 400 positioned within base 200, extension spring means 500 mounted in guide tube 400, locking means 600 for locking pedestal 100 in the desired position, and mounting means 700 for mounting table top T to pedestal 100.

Tubular base 200 has a top 202, a bottom (not shown), an exterior surface 206, and an interior surface 208. Preferably, it is made of case aluminum, but can be made from any other suitable material. Base 200 is provided with a countersunk bore 210 for a purpose to be described hereinafter.

Collar 300 is coaxial with base 200. It has a top 302, a bottom (not shown), an exterior surface 306, and an interior surface 308. Collar 300 is provided with a longitudinally-extending access slot 310 positioned to register with countersunk bore 210 of base 200 and a plurality of radial, spaced-apart, countersunk bores 312 at top 302 (FIGS. 3 and 4), for purposes to be described hereinafter. Collar 300 can also be provided with decorative effects such as ribs 314 to enhance the aesthetic appearance of pedestal 100. Collar 300 can made of aluminum, rigid PVC, or any other suitable material.

Guide tube 400 is interior to base 200 and coaxial with both base 200 and collar 300. As will be set forth in greater detail hereinafter, guide tube 400 and collar 300 are mounted to a common surface, so that guide tube 400 is movable with collar 300 between an extended position (FIG. 1) and a retracted position (FIG. 2) with respect to base 200.

Guide tube 400 has a top 402, a bottom 404, an exterior surface 406, and an interior surface 408. Guide tube 400 preferably has a square or rectangular cross-section, in order to permit optimum engagement with locking means 600, as will be described in greater detail hereinafter. Guide tube 400 is provided on first and second opposed sides with a pair of opposed, longitudinally-extending guide slots and on a third side with a longitudinally-extending locking slot 412, also for purposes to be described hereinafter. Locking slot 412 is positioned to align with access slot 310 of collar 300 and bore 210 of base 200. Guide tube 400 preferably is made of commercial grade steel, but can be made from any other suitable material.

Extension spring means 500 comprises upper and lower transverse bars 502 and 504 extending respectively across top 202 of base 200 and bottom 404 of guide tube 400, and a pair of longitudinally-extending, parallel, space-apart extension springs 506. The longitudinal axes of extension springs 506 are parallel to the axes of the base, collar, and guide tube. Extension springs 506 are provided at either end with round hooks 508 for engaging upper and lower bars 502 and 504, so as to mount extension springs 506 within guide tube 400. Upper bar 502 is positioned on top 202 of base 200 for sliding travel within guide slots 410 of guide tube 400. It can be held in place by the combined action of gravity and the tension of extension springs 506. Lower bar 504 is held in place by welding or the like against the bottom 404 of guide tube 400.

Locking means 600 comprises a locking block 602 and a conventional, flat-head locking screw 604 for engaging locking block 602. Locking block 602 comprises an outer block 602a and an inner block 602b which bear respectively against exterior surface 404 and interior surface 406 of guide tube 400 for sliding engagement with locking slot 412. Outer block 602a is provided with a horizontal unthreaded bore 606 and inner block 602b is provided with a horizontal threaded bore 608 coaxial with unthreaded bore 606. Bores 606 and 608 are positioned to register with countersunk bore 210 and receive locking screw 604, the head of locking screw 604 being recessed in bore 210. Because locking screw 604 is flat-headed and bore 210 through which it is inserted is countersunk, locking screw 604 is virtually hidden from view.

Mounting means 700 comprises a plate 702 having upper and lower surfaces 704 and 706, and a ring 708 having a top 710, a bottom 712, and a plurality of radial, spaced-apart, threaded bores 714. Upper surface 704 of plate 702 is attached to the lower surface of table top T, while top 710 of ring 708 is attached to lower surface 706 of plate 702. Ring 708 is aligned with and has the same cross-section as base 200 so as to engage the interior surface 306 of collar 300 at its top 302. Threaded bores 714 are placed in registration with countersunk bores 312 in collar 300, and conventional flat-head screws 716 are inserted therethrough to secure table top T to collar 300.

In use, extension springs 506 will normally bias collar 300 and guide tube 400 in their extended positions (FIG. 1), as extension springs 506 normally are in a retracted condition. When pedestal 100 is in this fully-extended position, upper bar 502 will be at the bottom of guide slots 410 and locking screw 604 will be at the bottom of access slot 310 and locking slot 412. When pressure is exerted against the top of table top T, and thereby against top 402 of guide tube 400, extension springs 506 assume an extended condition and table top T is lowered. In the fully-retracted position of pedestal 100, upper bar 502 is at the top of guide slots 410 and locking screw 604 is at the top of axis slot 310 and the top of locking slot 412.

Locking means 600 can be used to lock pedestal 100 in any desired position between its fully-extended and fully-retracted positions. Pedestal 100 is locked in position by tightening locking screw 604 to squeeze blocks 602a and 602b together to act as a break against guide tube 400. Loosening locking screw 604 releases blocks 602a and 602b. Locking screw 604 is accessible for adjustment through access slot 310 of collar 300.

Referring now to FIGS. 3 and 4, there is shown a second embodiment of an adjustable pedestal 100' according to the invention. Pedestal 100' is similar to pedestal 100 except for the position of locking means 600 relative to extension springs 506, and the consequent positioning of the locking and guide slots of guide tube 400. In pedestal 100, locking means 600 is offset from the plane defined by the longitudinal axes of extension springs 506, and the longitudinal axis of locking screw 604 is perpendicular to that plane. In pedestal 100', the plane defined by the longitudinal axes of extension springs 506 intersects locking means 600, and the longitudinal axis of locking screw 604 lies in that plane. The difference in the relative positions of springs 506 and locking means 600 in pedestal 100' allows one of guide slots 410 also to be used as the locking slot 412 along which locking means 600 travels. This configuration is simpler than that used in pedestal 100, but is somewhat less stable.

As can be seen from the above, the configurations of base 200, collar 300, guide tube 400, extension spring means 500, and locking means 600 that permit the adjustment of pedestals 100 and 100' can be housed in the upper part of the pedestals due to the use of extension springs 506 in extension spring means 500. Space thus is left at the bottom of pedestals 100 and 100' for a weight 800, resulting in the increased stability of the article of furniture or the like as a whole.

From the above, it is apparent that many modifications and variations of the present invention are possible in light of the above teachings. It is therefore to be understood that, within the scope of the appended claims, the invention may be practiced otherwise than as specifically described.

What is claimed is:

1. An adjustable pedestal comprising:
    a tubular base having a top, a bottom, an exterior surface, and an interior surface;
    a tubular collar having a top, a bottom, an exterior surface, and an interior surface, said interior surface telescopically engaging said exterior surface of said base, and said collar being coaxial with said base and movable between an extended and a retracted position with respect to said base;
    a guide tube interior to said base and coaxial with said base and said collar, said guide tube being movable with said collar between an extended and a retracted position with respect to said base;
    extension spring means for normally biasing said collar and said guide tube in their extended positions, said extension spring means normally being in a retracted condition, whereby a force exerted on said top of said guide tube causes said extension spring means to assume an extended condition; and
    locking means for locking said guide tube in one of said extended or retracted positions or a position in between.

2. The pedestal of claim 1, said extension spring means being positioned within said guide tube.

* * * * *